Sept. 18, 1951     A. GENOVESE     2,568,332
DEVICE CONTROLLING FLOW OF MATERIAL INTO A HOPPER, RESPONSIVE
TO MATERIAL LEVEL IN SAID HOPPER Filed April 15, 1946     2 Sheets-Sheet 1

Inventor
Anthony Genovese

By    Karl W. Flocks
                   Attorney

Sept. 18, 1951 A. GENOVESE 2,568,332
DEVICE CONTROLLING FLOW OF MATERIAL INTO A HOPPER, RESPONSIVE
TO MATERIAL LEVEL IN SAID HOPPER
Filed April 15, 1946 2 Sheets-Sheet 2

INVENTOR
Anthony Genovese
KARL W. FLOCKS
BY ATTORNEY

Patented Sept. 18, 1951

2,568,332

UNITED STATES PATENT OFFICE 2,568,332

DEVICE CONTROLLING FLOW OF MATERIAL INTO A HOPPER, RESPONSIVE TO MATERIAL LEVEL IN SAID HOPPER

Anthony Genovese, Baltimore, Md., assignor to The National Plastic Products Company, Odenton, Md., a corporation of Maryland Application April 15, 1946, Serial No. 662,375

6 Claims. (Cl. 222—56)

This invention relates to a feed control in connection with the feeding of small particles and more particularly to a feed control for plastic molding machines such as plastic extruders, for example, to which plastic particles such as powder or pellets, for example, are fed from a hopper.

Prior to the instant invention, it has been customary to feed the feed hopper of a plastic molding machine by scooping up a scoopful of plastic particles to be molded from a mass of this material and then transferring this scoopful of material directly into the feed hopper of the molding machine. Such prior practice required considerable attention from the machine operator and also required considerable labor.

It also is common in the molding art to employ the vibrator type of feed wherein a relatively large hopper is filled with the plastic particles which flow from the bottom of the large hopper onto a sloping vibrating tray which in turn feeds the hopper of the molding machine in accordance with the intensity of the vibration imparted to the vibrating tray. As the molding machine to which the particles are fed requires more or less plastic particles in the performance of its operations depending upon various factors, including changes of temperature and humidity in the ambient about the molding machine, the size of the section being molded, tolerances and the like, it has been found necessary to control the intensity of the vibrations of the vibrating tray. The intensity of vibrations have been commonly controlled by utilizing an alternating current source and the current therefrom is passed through a half-wave rectifier so that the current emanating therefrom is an intermittent direct current. This intermittent direct current is then passed through a variable resistance so that the value of the current may be diminished or increased and then it is passed through a solenoid which attracts a keeper secured to the vibrating tray. The keeper is influenced by a spring so that in the interval between the pulsations of current passing through the solenoid the spring will move the tray away from the solenoid. Accordingly, as the resistance in the circuit is increased the amplitude of the vibrations will be decreased and as the resistance in the circuit is decreased the amplitude of the vibrations will be increased. It has been attempted for a given molding job to utilize this equipment by adjusting the variable resistance to a point which would theoretically provide for a feed at a rate corresponding to that required by the molding machine in the production of its work. However, in practice this arrangement has not been found to be satisfactory in all cases and it has been found to be necessary to make frequent adjustments to the variable resistance in order to provide the proper feed and if the proper adjustment is not attended to at the proper time, the molding machine may become starved with resulting failure of the work being produced by the machine and requiring shut down, cleaning, etc. In addition, these frequent adjustments take up the time of the operator so that the operator will have less time to attend to other machines or other adjustments in connection with the work on the same machine.

It is an object of the instant invention to teach an arrangement whereby a molding machine may be automatically fed plastic particles in accordance with the requirements of the machine to produce a specific job which arrangement requires a minimum of attention from the machine operator.

It is another object of the invention to provide an automatic feed control for a molding machine.

It is still another object of the invention to teach a novel method for feeding plastic particles to a molding machine.

Other objects and the nature and advantages of the instant invention will be apparent from the following description taken in conjunction with the accompanying drawings, wherein.

Figure 1:
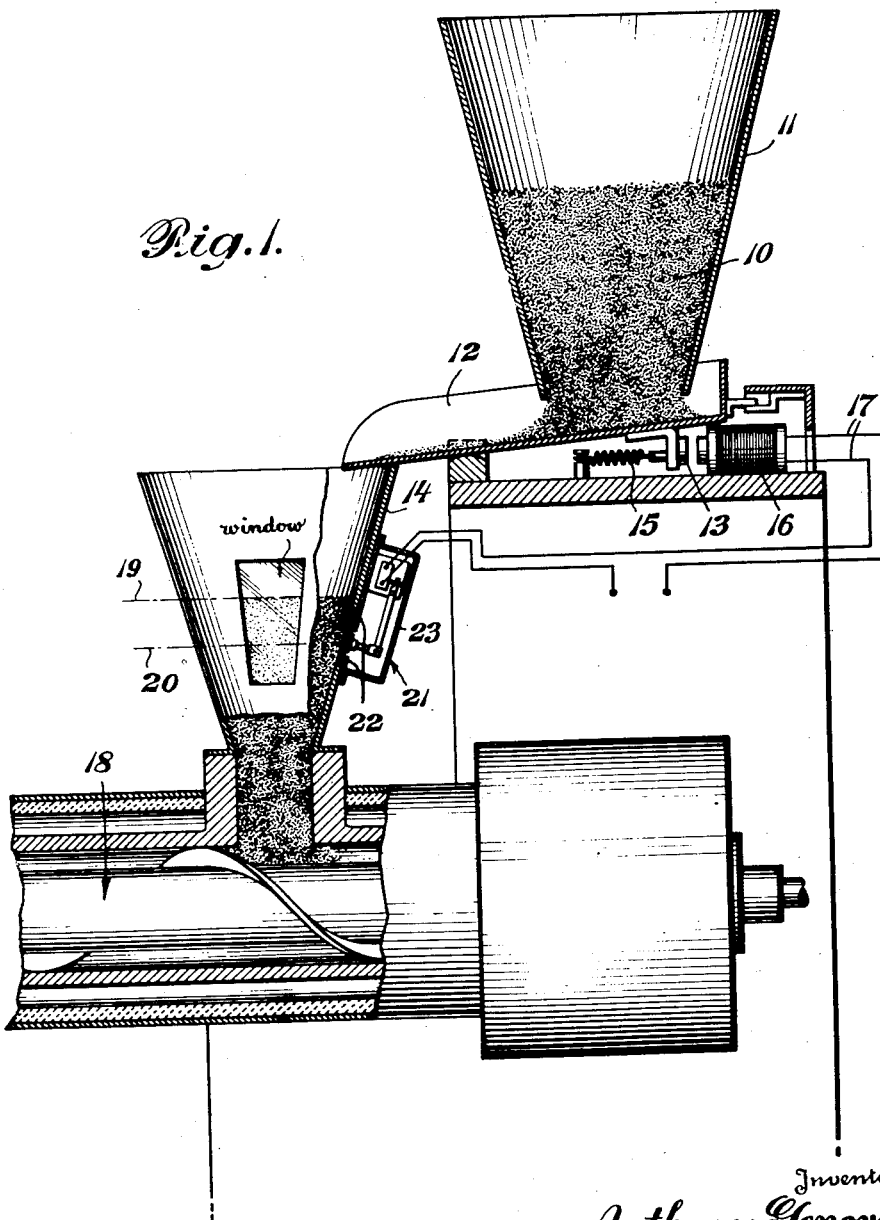
Figure 1 is a diagrammatic vertical section of a portion of the apparatus in accordance with the invention with parts shown in elevation.
Figure 2:
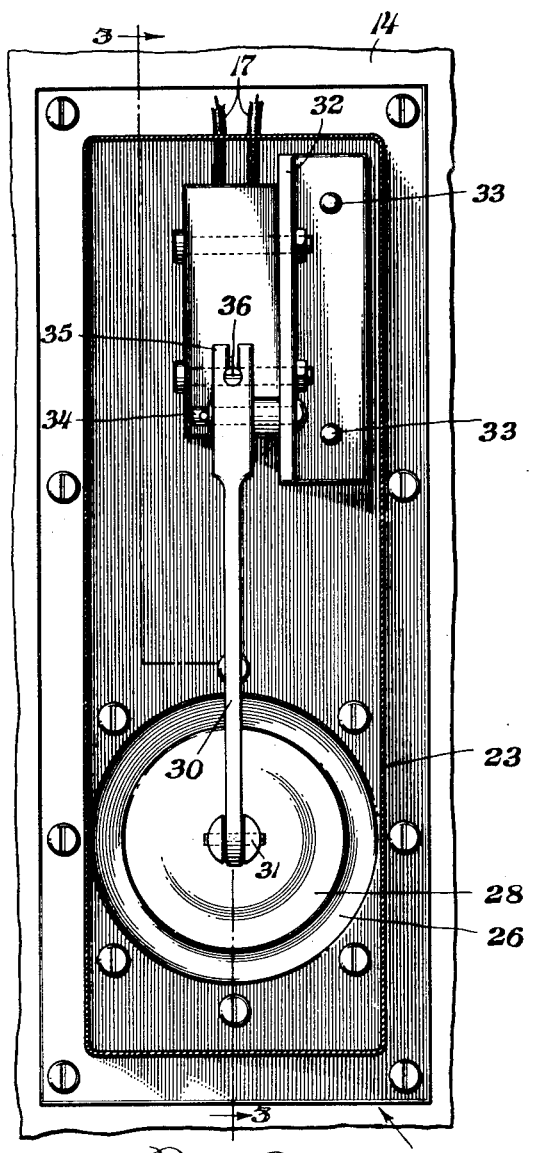
Fig. 2 is a view in elevation of one of the elements of the apparatus with parts shown in section.

Referring to the drawings, the plastic particles 10 are fed to the primary hopper 11 which empties on to the vibrating tray 12. Secured to the bottom of the vibrating tray 12 is the keeper 13 which is alternately influenced in a direction toward the secondary hopper 14 by the tension spring 15 and away from hopper 14 by the solenoid 16 which is energized by an intermittent direct current which passes through the electrical circuit 17. This intermittent direct current may be produced from an alternating current source, the current from which is passed through a conventional half-wave rectifier. A variable resistance may be placed in series with said half-wave rectifier and said variable resistance may be so adjusted as to include in the electrical circuit a minimum of resistance so that the intensity or amplitude of the vibrations of the vibrating tray 12 may be a maximum. Instead of using the variable resistance, a fixed resistance may be used or no resistance at all may be used. That portion of the circuit which produces the intermittent direct current of the required value may be conventional and is not illustrated.

The vibrating tray 12 which is slightly inclined downwardly toward the mouth of the secondary hopper 14, serves to continuously feed the secondary hopper 14 as long as the circuit 17 is energized and any variations in the amplitude of vibrations of the vibrating tray 12 which may arise because of the nature of the mechanism which imparts the vibrations to the tray 12, and any other factors such as the temperature and humidity in the ambient which may cause variations in the flow of the particles to the tray 12, such as would cause variations in the feed to the secondary hopper 14, will not affect the feed to the molding machine 18 as the level of plastic particles within the secondary hopper 14 is maintained between the limits of a predetermined high level 19 and a predetermined low level 20 by the control element 21 which serves to interrupt the circuit 17 when the secondary hopper 14 is filled with particles up to the predetermined high level 19 and serves to close the circuit 17 when the plastic particles within the secondary hopper 14 are down to the predetermined low level 20.

Figure 3:
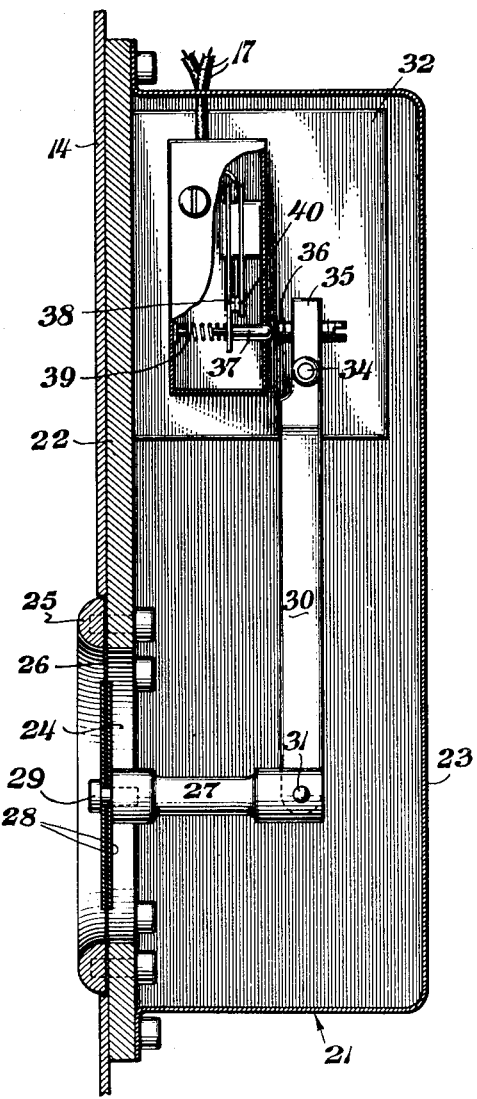
Fig. 3 is a sectional view taken generally along line 3—3 of Fig. 2 and looking in the direction of the arrows and with parts shown in elevation.

The control element 21 comprises a base 22 and a cover 23. The base 22 is secured to the side of the secondary hopper 14 as shown in Fig. 1, and is formed with a cut-out portion 24 to which is secured, by the ring 25, the load sensitive membrane 26 which may comprise a thin flexible sheet of "Vinylite" of about 5 mills thickness. As the specific gravity of the plastic particles is increased, the thickness of the load sensitive membrane or diaphragm 26 may be increased. The link 27 is fixedly secured to the diaphragm 26 by the washers 28 and the screw 29. The opposite end of the link 27 is secured to the lever 30 by the pivotal connection 31. The lever 30 is secured to the bracket 32 which in turn is secured to the base 22 by the rivets 33 by the fixed pivot 34. Secured in threaded relation to the lever 30 and near the end 35 thereof is the adjustable push button 36 which is adapted to contact the button 37 which button 37 is physically connected to the electrical contact 38 and which button 37 is under the influence of the compression spring 39 which tends to keep the button 37 in contact with the button 36. As shown in Fig. 3, the contact 38 is touching the contact 40.

In the operation of the device, the plastic particles 10 may be fed to the primary hopper 11 by the attendant in any known manner at regular intervals during the day. The electrical circuit 17 may be energized with an intermittent direct current of fixed frequency and intensity and no adjustments to the frequency or intensity need be made. As the particles fall upon the vibrating tray 12 they will be fed to the secondary hopper 14 until the level of particles therein reaches the predetermined high level 19 whereupon the load on the sensitive diaphragm 26 will be such that the link 27, see Fig. 3, will move to the right and the lever 30 will rotate in a counter-clockwise direction causing the button 36 to push the button 37 inwardly against the action of the compression spring 39 and the contact 38 will be pushed away from the contact 40, thereby breaking the electrical circuit 17 whereupon the vibrating tray 12 will no longer vibrate and as the molding machine 18 continues to operate the level of plastic particles within the secondary hopper 14 will gradually drop until the predetermined low level 20 is reached. When the level 20 within the secondary hopper 14 is reached, there will be substantially no load on the sensitive diaphragm frame 26 and the compression spring 39 will push the contact 38 into engagement with the contact 40 as shown in Fig. 3 and bring the lever 30 and link 27 back to its original position. With the contact 38 in engagement with the contact 40, the electrical circuit 17 will again be energized and the tray 12 will vibrate and feed particles to the secondary hopper 14 until the predetermined high level 19 is again reached whereupon the cycle recited will be repeated.

It has been found in practice that with this uniform feed, closer dimensional tolerances of molded sections have been maintained. In addition, a single operator has been able to attend to more machines thereby saving considerable labor in the production of a greater quantity of better quality work.

It will be obvious to those skilled in the art that various changes may be made without departing from the spirit of the invention and, therefore, the invention is not limited to what is shown in the drawings and described in the specification but only as indicated in the appended claims.

I claim:

1. In an apparatus for feeding plastic particles to an extrusion machine, a primary hopper, a secondary hopper, an extrusion machine, said secondary hopper being directly connected to the feed opening of said extrusion machine, means for discharging particles from said primary hopper into the mouth of said secondary hopper, a weight sensitive diaphragm sensitive to the weight of particles within said secondary hopper moving outwardly to discontinue the discharge of particles into said secondary hopper when the level of particles therein has reached a predetermined maximum, means controlled by the movement of said diaphragm and operatively connected therewith, and spring means operatively connected to said diaphragm controlled means for urging said weight sensitive means inwardly to start the discharge of particles into the secondary hopper when the level of particles therein has reached a predetermined minimum.

2. In an apparatus for feeding plastic particles to an extrusion machine, wherein a relatively constant level of the particles is maintained over the feed opening of the extrusion machine, a primary hopper, a secondary hopper, an extrusion machine, said secondary hopper being directly connected to the feed opening of said extrusion machine, an inclined tray for conveying particles from said primary hopper to said secondary hopper, electrical means including an electrical circuit for vibrating said tray, a relatively small thin, flexible, vinylite diaphragm in the side wall of said secondary hopper located at a height therein that is at the desired level of plastic particles for de-energizing said electrical means due to the weight of particles forcing the diaphragm outwardly when the level of particles has risen to the level of the diaphragm, and spring means for urging the diaphragm inwardly to energize said electrical means when the weight of the particles no longer bears on the diaphragm.

3. In an apparatus in accordance with claim 2, a leverage system connected to said diaphragm, and a switch connected to said leverage system, said switch being connected in said electrical circuit for controlling same.

4. An apparatus for feeding plastic particles to an extrusion machine wherein a relatively constant level of the particles is maintained over the feed opening of the extrusion machine, comprising a primary hopper, a secondary hopper, said secondary hopper being directly connected to the feed opening of said extrusion machine, means for conveying plastic particles from said primary hopper to said secondary hopper, electrical means including an electrical circuit for actuating said conveying means, control means responsive to the level of particles within said secondary hopper for making and breaking said electrical circuit, said control means comprising a base secured to the side wall of the secondary hopper, an opening in said side wall of the secondary hopper, an opening in said base adjacent to the opening in said hopper, a thin flexible diaphragm covering the said openings, a link attached at one end to the center portion of said diaphragm, a lever pivotally connected at one end to the end of the said link not connected to the diaphragm, an adjustable push button attached to the opposite end of the lever, a fixed pivot for the lever intermediate thereof located nearer to the end attached to the push button, a spring actuating the diaphragm inwardly, a switch for making and breaking said electrical circuit comprising a pair of contacts normally in closed position, said push button contacting one of said contacts in such a manner that when the level of particles in the secondary hopper exceeds a prescribed level the weight of the particles on the diaphragm will counteract the spring pressure and move the diaphragm outwardly, thus moving the link outwardly and causing the said lever to rotate about the said fixed pivot so that the push button will force the switch contacts apart thus breaking the circuit and thereby stopping the feed of particles from the primary to the secondary hopper until the level has dropped therein below the prescribed level resulting in the closing of the switch.

5. An apparatus in accordance with claim 4 wherein one of the switch contacts extends beyond the point of contact with the other contact, a spring in contact with the extension of the said contact forcing the two contacts together, and a button attached to the extension of the said contact touching the adjustable push button whereby when the said lever pivots about its fixed pivot the push button moves the button and the contact against the action of the spring to force the switch contacts apart to break the circuit.

6. An apparatus for feeding particles to a hopper comprising a sensitive diaphragm built into the side wall of the hopper, control means responsive to the movement of the diaphragm controlling the feed to said hopper, and energizing and de-energizing means responsive to said control means operating to control the feed to the hopper due to the weight of the particles pressing on the diaphragm, said control means including a spring urging said diaphragm inwardly, and linkage means operatively connecting the spring to said diaphragm.

ANTHONY GENOVESE.

REFERENCES CITED

The following references are of record in the file of this patent:

UNITED STATES PATENTS

| Number | Name | Date |
|---|---|---|
| 434,702 | Cooley et al. | Aug. 19, 1890 |
| 1,398,790 | Ogur | Nov. 29, 1921 |
| 1,489,938 | Hale | Apr. 8, 1924 |
| 2,276,382 | Francis | Mar. 17, 1942 |
| 2,301,136 | Moreland | Nov. 3, 1945 |
| 2,381,505 | Lindholm | Aug. 7, 1945 |
| 2,381,802 | Booth et al. | Aug. 7, 1945 |
| 2,408,221 | Michel | Sept. 24, 1946 |
| 2,466,386 | Curioni | Apr. 5, 1949 |